W. G. COX.
AUTOMOBILE BUFFER.
APPLICATION FILED APR. 24, 1919.
1,335,877.
Patented Apr. 6, 1920.
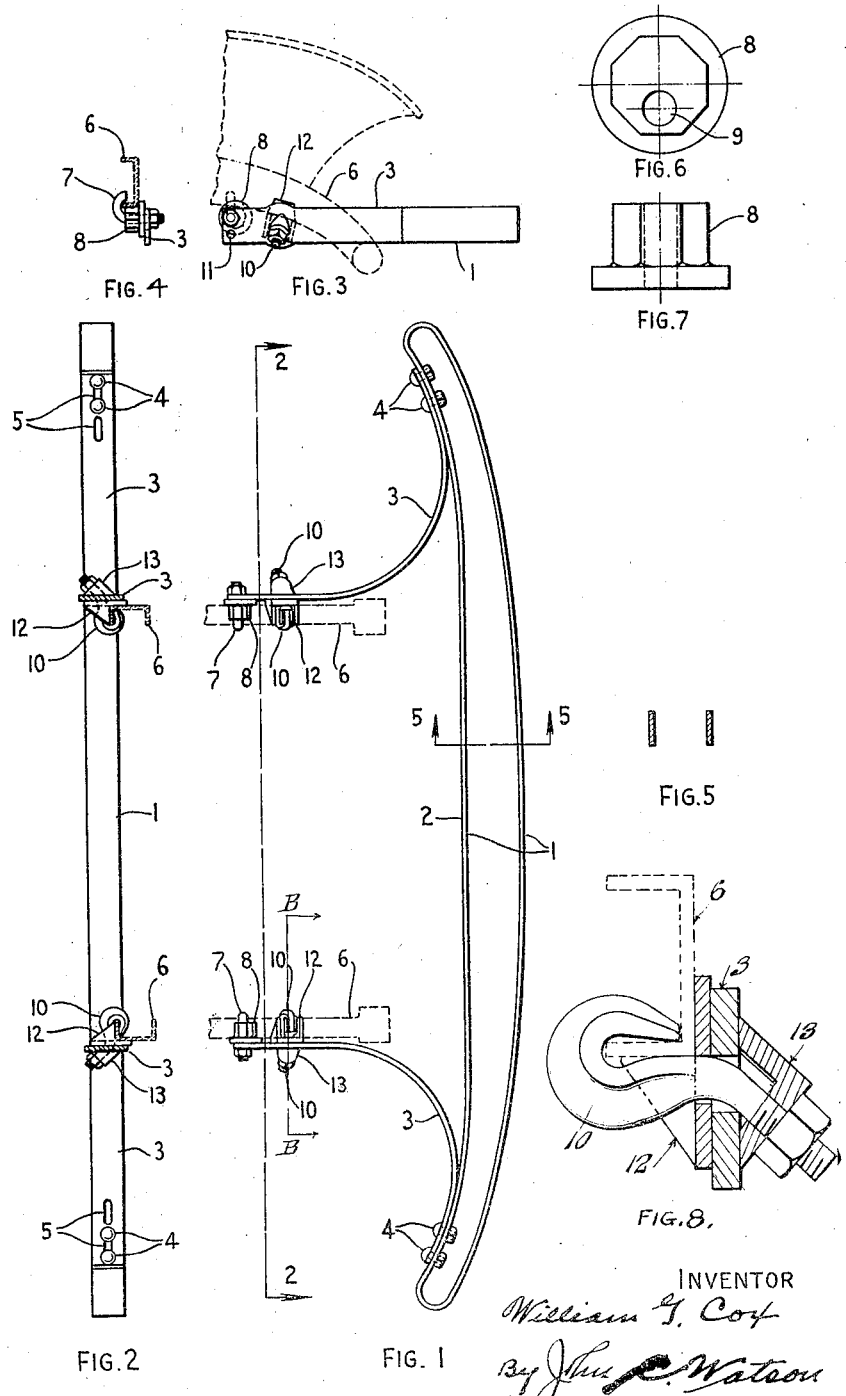

UNITED STATES PATENT OFFICE.

WILLIAM G. COX, OF ALBANY, NEW YORK, ASSIGNOR TO COX BRASS MANUFACTURING COMPANY, OF ALBANY, NEW YORK, A CORPORATION.

AUTOMOBILE-BUFFER.

1,335,877.     Specification of Letters Patent.     Patented Apr. 6, 1920.

Application filed April 24, 1919. Serial No. 292,273.

*To all whom it may concern:*

Be it known that I, WILLIAM G. Cox, a citizen of the United States of America, residing at the city of Albany, in the county of Albany and State of New York, have invented certain new and useful Improvements in Automobile-Buffers, of which the following is a specification.

My invention relates to spring buffers designed to be attached to the front or rear of an automobile, and the objects of my invention are, first: to provide a resilient spring of great ultimate resisting power; second, to provide a spring having a relatively small resisting power for absorbing ordinary impact and a relatively great resisting power for absorbing heavy impact; third, to provide a means of attachment which may be adjusted to fit different cars; and fourth, to provide a buffer of esthetic design having no projections on its face; together with such other elements and combinations as are hereinafter more particularly set forth.

I accomplish these objects by means of the mechanism illustrated in the accompanying drawing, in which:

Figure 1 is a plan view of my buffer.

Fig. 2 is a rear sectional elevation on the line, 2—2, Fig. 1.

Fig. 3 is a side elevation.

Fig. 4 is a side view of one attaching device.

Fig. 5 is a section of Fig. 1 on the line, 5—5.

Fig. 6 is a detail view of an attachment.

Fig. 7 is another view of the same attachment.

Fig. 8 is an enlarged section along the line, B—B, on Fig. 1.

Similar numerals refer to similar parts throughout the several views.

1, is a continuous loop or link spring having a cross section as shown in Fig. 5.

I prefer to form this spring of one piece of high grade carbon steel, welded together at the point, 2, which, when properly tempered, makes a very resilient spring having great resisting power. The outer bar is arched in the center, adding to the strength and making a handsome appearance. The inner bar bridges the resilient brackets, 3, 3, to which it is attached by the bolts, 4, passing through the slotted holes, 5. The object of slotting the holes is of course to permit the horizontal distance between the brackets, 3, 3, to be varied to fit different cars.

The brackets, 3, 3, are of spring steel, curved to fit the concave side of the loop spring, 1, and having straight portions tangential to the curved portions and designed to lie parallel to the side frames, 6, 6, of the car to which they are attached.

In order to attach my buffer to the frame of the car, I provide two hook bolts in each bracket. At the rear end of the bracket, 3, is the hook bolt, 7, engaging the edge of the lower flange of channel, 6. The hook bolt, 7, passes through the fitting, 8, the surface of which resting against the bottom of the lower flange of the channel, 6, is octagonal in section. The hole, 9, in the fitting, 8, through which the hook bolt, 7, passes is drilled eccentrically, so that by turning the fitting, 8, about the hook bolt, 7, the bumper may be adjusted vertically about the hook bolt, 10, as a fulcrum. When sufficient adjustment cannot be obtained by turning the fitting, 8, the hook bolt, 7, may be used in connection with the hole, 11, in the bracket, 3.

In front of the hook bolt, 7, I provide the hook bolt, 10, passing through the bracket, 3, at an angle of approximately forty-five degrees. The point of the hook bolt, 10, engages the fillet in the angle between the flange and the web of the channel, 6, and is in the line of the axis of the threaded portion of the bolt, 10, so that a direct pull is obtained thereon by tightening the nut. The angle block, 12, through which the hook bolt, 10, passes, fits against the outside of the web and flange of the channel, 6. In order that the nut on the hook bolt, 10, may bear upon a surface at right angles to the axis of the bolt, I provide the truncated cylindrical fitting, 13.

It is evident from the foregoing that I have provided a means for attaching my bumper to cars having various widths between side frames, and I have also provided a means for adjusting the height of the outer or impact end to suit variable conditions.

In the operation of the loop spring, it is evident that the outer part will flex under ordinary impact, and under heavy impact a certain portion will be absorbed by the outer spring until it is forced back against the rear spring, whereupon the rear part is brought into action and thereby greatly multiplies the resistance.

What I claim as my invention and desire to secure by Letters Patent is:

1. In an automobile buffer, an impact receiving member formed from a flat spring material into an elongated endless loop having rounded ends slightly curved in the plane of the loop sides so that a plan view of the loop discloses a convex and a concave side, said endless loop adapted to be mounted so that both sides thereof lie in a substantially horizontal plane across the end and in front of an automobile and parallel to the axles thereof; curved resilient supporting members adjustably attached to the concave side of the impact receiving member adjacent the rounded ends thereof; and means for removably attaching said supporting members to the side bars of an automobile frame, substantially as described.

2. In an automobile buffer, an impact receiving member formed from a flat spring material into an elongated endless loop having rounded ends slightly curved in the plane of the loop sides so that a plan view of the loop discloses a convex and a concave side, said endless loop adapted to be mounted so that both sides thereof lie in a substantially horizontal plane across the end and in front of an automobile and parallel to the axles thereof; curved resilient supporting members adjustably attached to the concave side of the impact receiving member adjacent the rounded ends thereof; an angle block adapted to engage with the outside of one flange and the web of a channeled side bar of an automobile frame; a hook bolt, the hook end thereof adapted to reach around one of the flanges of said channel and permit the end of the hook to engage one of the inner angles of said channel, the shank of said hook bolt being bent and adapted to pass through said angle block and an attaching hole in one of the supporting members at an angle of approximately forty-five degrees from the web of the channel; a nut coacting with said hook bolt to clamp a supporting member and an angle block securely to said automobile frame side bar; a fitting having a plurality of bearing surfaces and an eccentric bolt hole parallel to said surfaces; a hook bolt, the hook thereof adapted to engage the edge of one of the flanges of said channeled side bar, the shank to pass through the bolt hole of said fitting and an attaching hole in one of said supporting members; and a nut adapted to coact with said hook bolt to clamp said supporting member and said fitting securely to the automobile frame side bar, substantially as described.

3. In attaching devices for adjustably attaching automobile buffers to the side frame members of an automobile, a hook bolt having a hook designed to receive the lower flange of the side member; a point on said hook designed to engage the fillet between the flange and web of the side member; a shank on said hook designed to pass downwardly at an angle through a fitting engaging the bottom of the flange and the back of the web of the side member, and through the supporting member of the buffer; a truncated fitting surrounding said shank, bearing against the supporting member of the buffer and designed to provide a bearing surface at right angles to the axis of said shank for a nut, by means of which the supporting member of the buffer is securely clamped in position.

4. In attaching devices for adjustably attaching automobile buffers to the side frame member of the automobile, a hook bolt having a hook designed to engage the edge of the flange of the side member; a shank on said hook extending outwardly and parallel to the flange of the side member through a fitting and through the supporting member of the buffer, said fitting having a plurality of bearing surfaces parallel, but eccentric to said shank, in contact with the flange of the side member and designed to regulate the distance between said flange and shank; a flange on said fitting engaging the outside of the web of the side member; and a nut on said shank by means of which the supporting member of the buffer is securely clamped in position.

In testimony whereof I have affixed my signature.

WILLIAM G. COX.